(12) United States Patent
Fujimoto

(10) Patent No.: US 6,450,030 B1
(45) Date of Patent: Sep. 17, 2002

(54) SENSOR DEVICE FOR DETECTING ROTATIONAL ANGULAR VELOCITY, INCLINATION AND LINEAR ACCELERATION

(75) Inventor: Katsumi Fujimoto, Toyama-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/562,146

(22) Filed: May 1, 2000

(30) Foreign Application Priority Data

May 17, 1999 (JP) .......................................... 11-135987

(51) Int. Cl.$^7$ ............................................. G01C 19/00
(52) U.S. Cl. .................................................. 73/504.04
(58) Field of Search ...................... 73/504.02, 504.03, 73/504.04, 504.12, 504.14

(56) References Cited

U.S. PATENT DOCUMENTS

| | | | | |
|---|---|---|---|---|
| 5,677,486 A | * | 10/1997 | Nakamura et al. | ....... 73/540.14 |
| 5,696,322 A | * | 12/1997 | Mori et al. | ............... 73/504.12 |
| 5,794,080 A | * | 8/1998 | Watanabe et al. | ........ 73/504.12 |
| 5,854,428 A | * | 12/1998 | Okaguchi | ................ 73/504.12 |
| 5,902,931 A | * | 5/1999 | Mori et al. | ............... 73/504.12 |
| 5,969,248 A | * | 10/1999 | Kurachi et al. | .......... 73/504.12 |
| 6,058,777 A | * | 5/2000 | Fujimoto et al. | ......... 73/504.12 |
| 6,116,086 A | * | 12/2000 | Fujimoto | ................. 73/504.14 |
| 6,158,281 A | * | 12/2000 | Ebara et al. | ............. 73/504.12 |

* cited by examiner

Primary Examiner—Richard A. Moller
(74) Attorney, Agent, or Firm—Ostrolenk, Faber, Gerb & Soffen, LLP

(57) ABSTRACT

A sensor device for detecting a rotational angular velocity, an inclination and a linear acceleration, includes: a vibrating body; two detection portions to output signals in response to a vibration of the vibrating body; a differential circuit to output the difference between the signals output from the two detection portions; and a first synchronous detection circuit and second synchronous detection circuit to detect the output signal of the differential circuit. In the first synchronous detection circuit and second synchronous detection circuit the output signal of the differential circuit is detected in synchronization with respective signals having a phase difference of 90°.

8 Claims, 11 Drawing Sheets

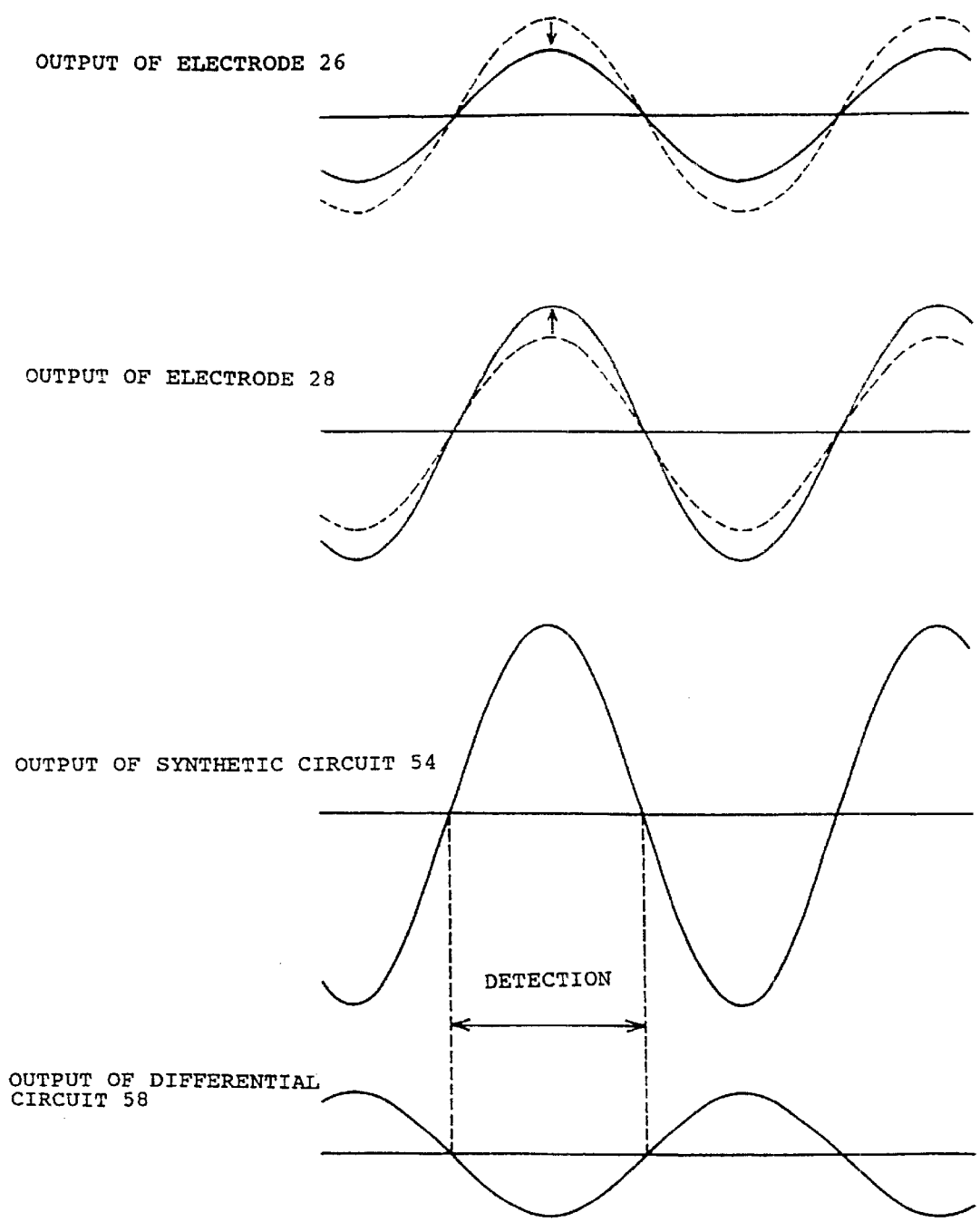

SENSOR DEVICE FOR DETECTING ROTATIONAL ANGULAR VELOCITY, INCLINATION AND LINEAR ACCELERATION

BACKGROUND OF THE INVENTION

1. Field of the Invention

This invention relates to a sensor device and particularly to a sensor device which can detect a rotational angular velocity, inclination and linear acceleration and is utilized for automobile body control, correction of video camera shake, and so on.

2. Description of the Related Art

FIG. 8 is a block diagram showing the circuit of a sensor device employed for automobile body control, and so on. The sensor device 10 contains a vibrator 12. The vibrator 12 contains a vibrating body 14 of a rectangular solid as shown in FIG. 9. The vibrating body 14 is formed by joining, for example, two piezoelectric substrates 16 and 18. These piezoelectric substrates 16 and 18 are polarized so that their polarization is opposite to each other as shown by the arrows in FIG. 9. On one piezoelectric substrate 16, a groove 20 is formed so as to extend in the length direction of the vibrating body 12 in the middle of the width direction. Further, two grooves 22 and two grooves 24 extending in the width direction of the piezoelectric substrate 16 are formed so as to sandwich the portions corresponding with the two nodal points at bending vibration of the vibrating body 14.

On the surface of the piezoelectric substrate 16 divided by these grooves 20, 22, and 24, electrodes are formed. Among these electrodes, the electrodes 26 and 28 formed between the inside grooves 22 and 24 are used as detection portions for outputting signals in response to a vibration of the vibrating body 14. Further, on the other piezoelectric substrate 18, a common electrode is formed.

The vibrator 12 is supported by supporting members 32, 34, 36, and 38 formed by metal wires, etc. The supporting member 32 is connected to the electrodes 40 sandwiched by the two grooves 22 by welding, soldering, etc. This supporting member 32 is electrically connected to the electrode 26. Similarly, the supporting member 34 is connected to the electrode 42 sandwiched by the two grooves 24. This supporting member 34 is electrically connected to the electrode 28. Further, the supporting members 36 and 38 are connected to the common electrode 30 at the portions corresponding to the nodal points of the vibrating body 14. These supporting members 32, 34, 36, and 38 are formed in a bent shape and contained in a case 44.

The electrodes 26 and 28 of the vibrator 12 are connected to buffers 50 and 52, respectively. These buffers 50 and 52 are connected to a synthetic circuit 54, and the sum of the output signals from the buffers 50 and 52 is obtained in the synthetic circuit 54. The output signal of the synthetic circuit 54 is returned to an oscillation circuit 56, and amplified and phase shifted in the oscillation circuit 56. In this way, an excitation signal is produced, and the excitation signal obtained is input into the common electrode 30. Further, the buffers 50 and 52 are connected to a differential circuit 58, and the difference between the output signals from the buffers 50 and 52 is obtained. The output signal of the differential circuit 58 is input into a synchronous detection circuit 60, and detected in synchronization with the signal of the synthetic circuit 54. The signal detected in the synchronous detection circuit 60 is integrated in a integration circuit 62 and amplified in a DC amplifier.

In this sensor device 10, the vibrating body 14 vibrates under bending mode in the direction normal to the surface on which the common electrode 30 is formed, by an excitation signal obtained in the oscillation circuit 56. At this time, because the supporting members 32, 34, 36, and 38 support the portions corresponding to the nodal points of the vibrating body 14, there is little vibration leak of the supporting members 32 through 38. However, it cannot be said that there is no vibration leak from the supporting members 32 through 38, and the supporting members 32 through 38 are slightly vibrated. At this time, because the supporting members 32 through 38 are formed in a bent shape, the vibration of the supporting members 32 through 38 is absorbed, which prevents the vibration from leaking to the case 44.

Further, from the differential circuit 58, the difference between the signals output from the electrodes 26 and 28 is output. The output signal of the differential circuit 58 is detected in synchronization with the signal of the synthetic circuit 54 at the synchronous detection circuit 54. In the absence of any rotation, because the bending condition of the electrode portions 26 and 28 of the vibrating body 14 is the same, the same signal is output from the electrodes 26 and 28 as shown in FIG. 10. Therefore, any signal is not output from the differential circuit 58.

In such a condition, when rotation takes place about the axis of the vibrating body 14, a Coriolis force acts and the vibration direction of the vibrating body 14 is changed. Because of that, the bending condition of the electrode portions 26 and 28 is made different, and a difference is caused between the signals output from the electrodes 26 and 28. For example, as shown in FIG. 11, when the output signal of the electrode 26 increases, the output signal of the electrode 28 decreases. Therefore, from the differential circuit 58, the difference between these signals is output. Furthermore, because the change of the vibration direction of the vibrating body 14 is in accordance with the strength of the Coriolis force, the output signals of the electrodes 26 and 28 are also changed to be proportional to the Coriolis force. Further, because the output signal of the synthetic circuit 54 is the sum of the signals of the electrodes 26 and 28, the output signal of the differential circuit 58 and the signal of the synthetic circuit 54 are in phase. Therefore, by detecting the output signal of the differential circuit 58 in synchronization with the signal of the synthetic circuit 54, only the positive portion of the output signal of the differential circuit 58 can be detected. And by integrating the output signal of the synchronous detection circuit 60 through the integration circuit 62 and by amplifying it using the DC amplifier 64, a positive DC signal proportional to the Coriolis force can be obtained.

When the vibrator 12 is rotated inversely, as shown in FIG. 12, the output signal of the electrode 26 decreases and the output signal of the electrode 28 increases. Therefore, the output signal of the differential circuit 58 becomes in opposite phase to that in FIG. 11. On the contrary, because the output signal of the synthetic circuit 54 is in phase with FIG. 11, only the negative portion of the output signal of the differential circuit 58 is detected at the synchronous detection circuit 60. Therefore, a negative DC signal proportional to the Coriolis force can be obtained at the DC amplifier 64. Thus, the magnitude of a rotational angular velocity can be detected from the output signal of the DC amplifier 64, and the direction of a rotational angular velocity can be detected from the polarity of the output signal of the DC amplifier 64.

The use of such a sensor device 10 as, for example, a rollover sensor of automobiles, etc. has been considered. When an automobile is turned sideways, the roll-over sensor is to detect the rotational angular velocity and inflate a side air bag, and as a result, protect people from a traffic accident, which might result in injury or death. Further, the detection of rotational angular velocity using a sensor device is used for preventing video camera shake.

However, when an automobile is turned sideways while it is parked in a sloping place, the time from the start to finish of the turning is shorter than the case where the automobile is parked in a horizontal place, and accordingly it is required to inflate a side air bag by detecting only a little rotational angular velocity. That is, on the basis of the initial inclination of an automobile the timing of inflation of a side air bag must be controlled. Further, when the side of an automobile is bumped by another, a signal concerning the rotational angular velocity of the automobile turning sideways may be erased by acceleration noise due to the bump, and the processing of the signal is made difficult. In order to detect all these three conditions, an angular velocity sensor, an inclination sensor, and an acceleration sensor are needed.

Further, the correction of video camera shake by detection of the rotational angular velocity has become common, but a horizontal detection is considered for an image stabilization system as a next step. This relates to a rotational movement and after all the detection of absolute horizontality is required.

SUMMARY OF THE INVENTION

The present invention can solve the aforementioned drawback associated with the conventional art and provides a sensor device which is able to detect not only rotational angular velocity, but also inclination and linear acceleration.

The sensor device for detecting a rotational angular velocity, an inclination and a linear acceleration, comprises a vibrating body, two detection portions to output signals in response to a vibration of the vibrating body, a differential circuit to output the difference between the signals from the two detection portions, a first synchronous detection circuit and second synchronous detection circuit to detect the output signal of the differential circuit in synchronization with the signal from a synthetic circuit. In the first synchronous detection circuit and second synchronous detection circuit, the output signal from the differential circuit is detected in synchronization with respective signals having a phase difference of 90°.

In such a sensor device, a weight can be added to the vibrating body.

Further, supporting members for supporting the vibrating body are contained and a weight may be added to these supporting members.

In the absence of any rotation, the output signals from the two detection portions are in phase and of the same level. Here, when a rotational angular velocity is applied to a vibrator, the vibration direction of the vibrating body is changed due to Coriolis force and the level of the output signals from the two detection portions alters, but they are in phase. When the output signals from the two detection portions are in phase, the difference between the signals becomes in phase with the output signals of the two detection portions.

When gravity and linear acceleration are applied in a direction different from the vibration direction of the vibrating body, different stresses are applied to the two detection portions, a difference between the resonance frequencies of the portions is caused, and phase-shifted signals are output from the detection portions. When the difference between such signals is output, a signal having a phase difference of about 90° from the output signals of the detection portions at the time when gravity, etc. are not applied can be obtained.

Because of that, between the output signal obtained from the differential circuit when a rotational angular velocity is applied and the output signal obtained from the differential circuit when gravity, etc. are applied, a phase difference of about 90° is caused. Therefore, by detecting the output signal of the differential circuit in synchronization with a signal of a phase difference of 90° rotational angular velocity can be detected and at the same time gravity or linear acceleration can be detected.

In such a sensor device, by addition of a weight to the vibrating body, or by addition of a weight to the supporting members for supporting the vibrating body the stress due to gravity and linear acceleration can be increased, and the detection sensitivity of these can be improved.

According to the invention, a sensor device for detecting all of rotational angular velocity, inclination, and linear acceleration can be obtained. Consequently, by using the sensor device the timing of inflation of an automobile air bag can be effectively controlled and video camera shake can be also effectively prevented.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIG. 12 shows the waveforms representing the signal of each portion and the timing of detection in a synchronous detection circuit at the time when a vibrator is rotated in another direction.

DETAILED DESCRIPTION OF EMBODIMENTS OF THE INVENTION

Hereinafter, the preferred embodiments of the present invention are explained in detail with reference to the drawings.

Figure 1:
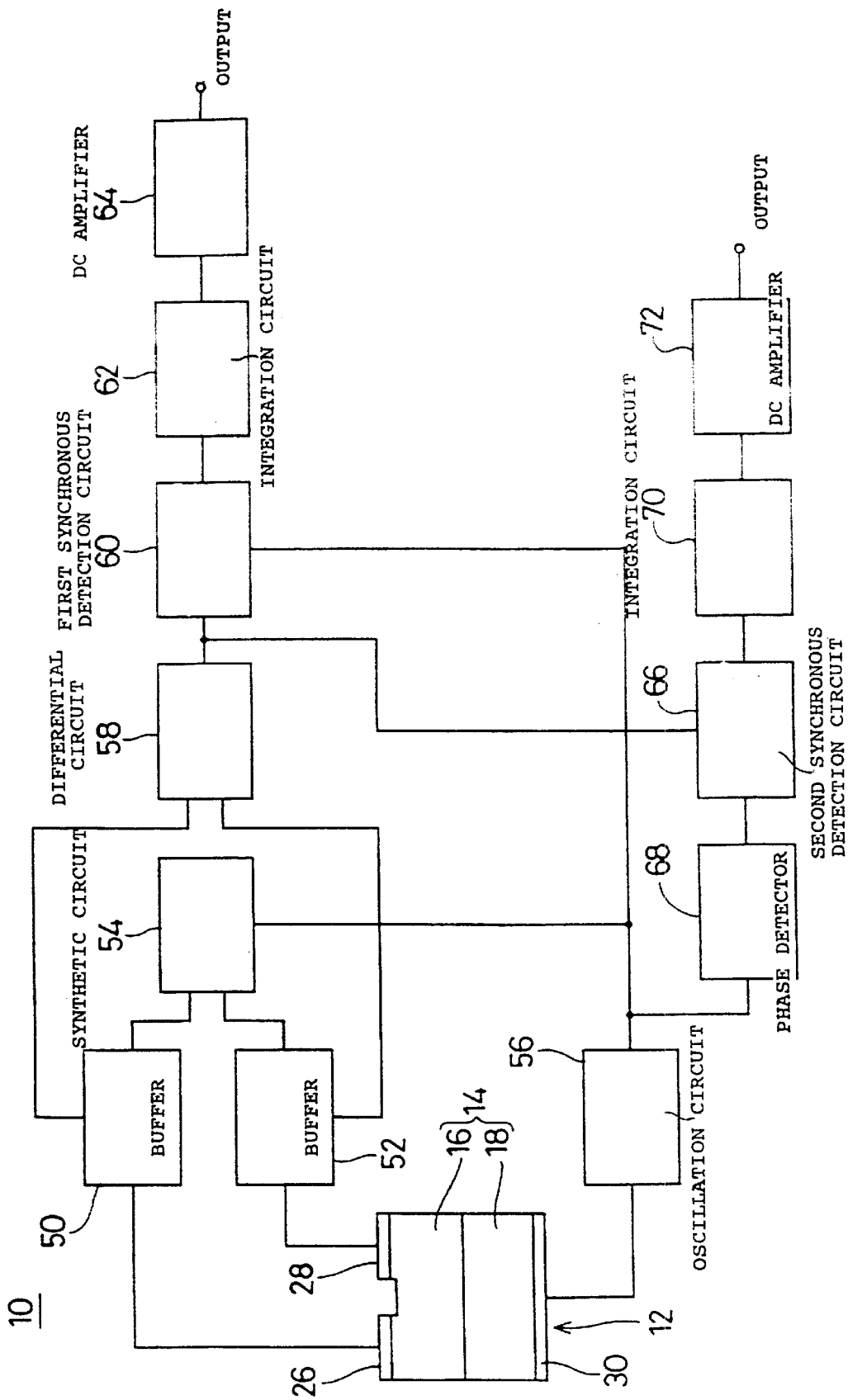
FIG. 1 is a block diagram showing one example of the circuit of a sensor device of the invention.
Figure 8:
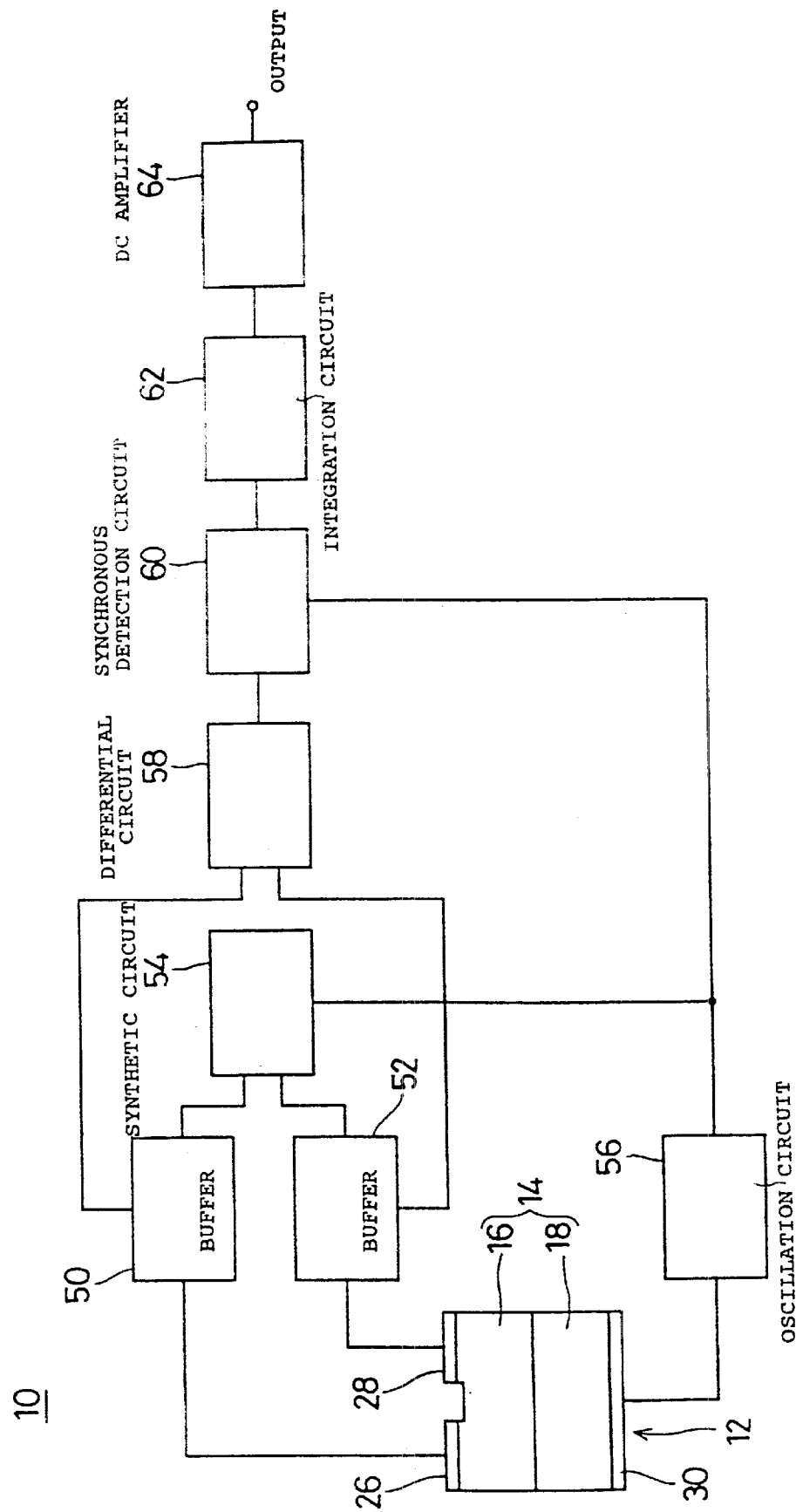
FIG. 8 is a block diagram showing one example of the circuit of a sensor device as the background of the invention.

FIG. 1 is a block diagram showing one example of the circuit of a sensor device of the invention. The sensor device 10 contains the construction of the sensor device shown in FIG. 8. Here, the synchronous detection circuit 60 shown in FIG. 8 constitutes a first synchronous detection circuit in FIG. 1. In the sensor device 10 of the invention, the output signal of a differential circuit 58 is input into a second synchronous detection circuit 66 different from the first synchronous detection circuit 60. Further, the signal of a synthetic circuit 54 is input into a phase detector 68 and given to the second synchronous detection circuit 66 after a phase correction of 90°. And in the second synchronous detection circuit 66, the output signal of the differential circuit 58 is detected in synchronization with the signal of the phase detector 68. The output signal of the second synchronous detection circuit 66 is integrated in an integration circuit 70 and further amplified at a DC amplifier 72.

Figure 2:
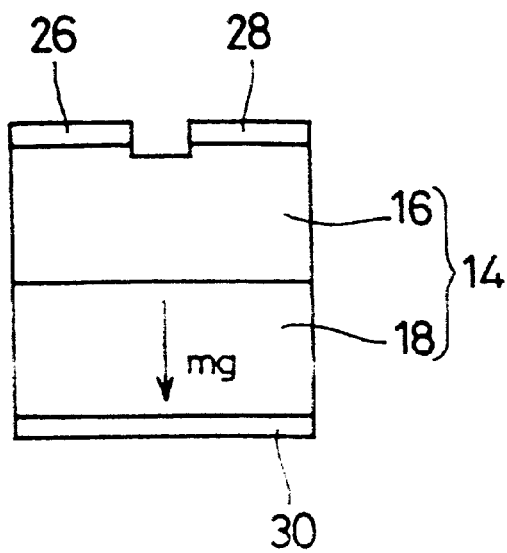
FIG. 2 is a schematic illustration showing the state where gravity is applied in the same direction as the vibration direction of a vibrator used in the sensor device in FIG. 1 to the vibrator.
Figure 3:
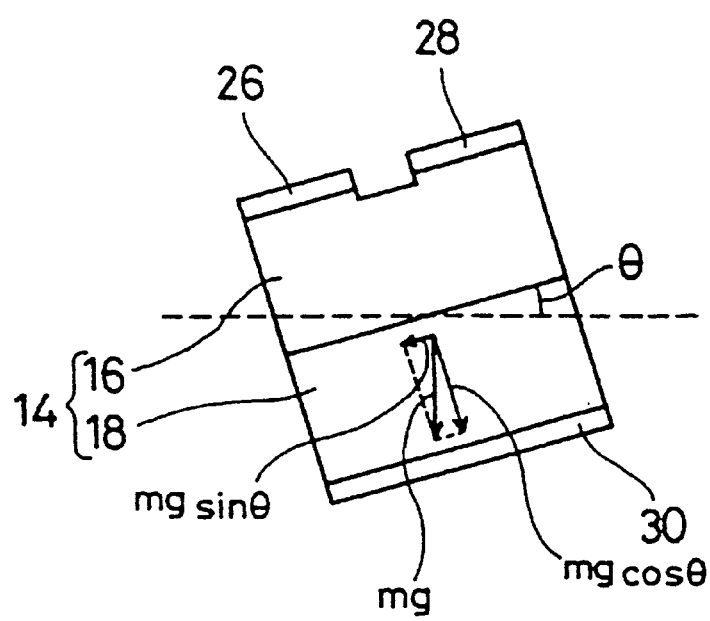
FIG. 3 is a schematic illustration showing the state where gravity is applied in a different direction from the vibration direction of a vibrator used in the sensor device in FIG. 1 to the vibrator.

In the sensor device 10, the rotational angular velocity about the axis of a vibrating body 14 can be detected using the first synchronous detection circuit 60, a integration circuit 62, and a DC amplifier 64. The sensor device 10 is used as, for example, a rollover sensor of an automobile, and when the automobile is parked in a horizontal place, as shown in FIG. 2, the force of mg acts because of the mass m of the vibrating body 14, and the electrodes 26 and 28 of the vibrating body 14 are subjected to the same stress in the bending direction, respectively. Here, g represents the acceleration of gravity. When the automobile is parked in a sloping place, as shown in FIG. 3, a force of mg is applied in a direction different from the vibration direction of the vibrating body 14. Therefore, a larger stress is applied to the electrode portion 28 of the vibrating body 14 situated near the direction of the force of mg, and a smaller stress is applied to the electrode portion 26 situated far from the direction of the force of mg.

Figure 4:
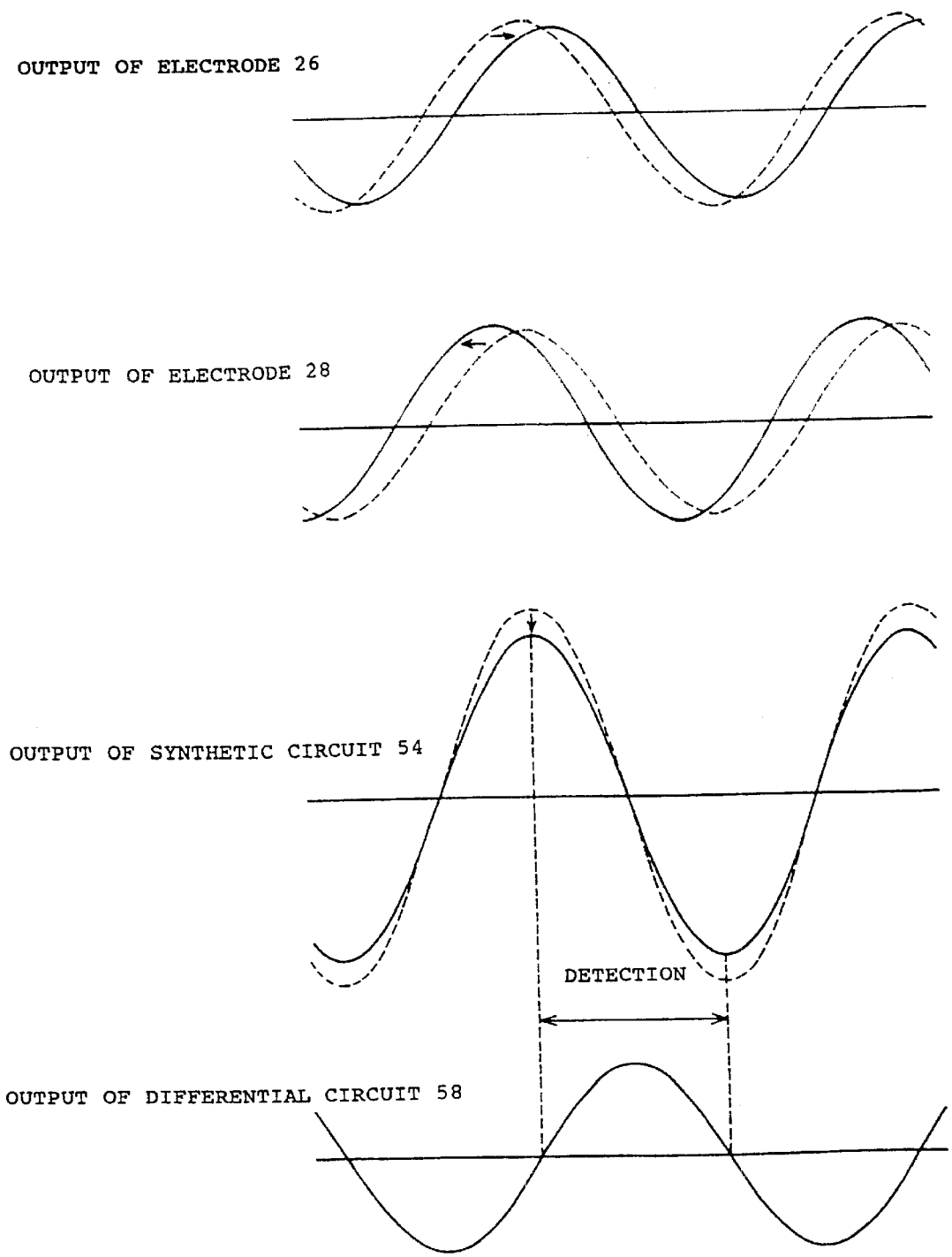
FIG. 4 shows the waveforms representing the signal of each portion at the time when a vibrator is inclined in one direction and the timing of detection in a second synchronous detection circuit.

Because of such a difference in stress, a difference in resonance frequency is caused between the electrode portion 26 of the vibrating body 14 and the electrode portion 28 of the vibrating body 14, and the output signal of the electrode 26 is phase shifted compared with the basic vibration in the absence of any rotation as shown in FIG. 4. Further, the output signal of the electrode 28 is phase shifted in the opposite direction to the output signal of the electrode 26. In this way, when there is a phase difference between the output signals of the electrodes 26 and 28, the sum of these signals becomes nearly in phase with the sum of the output signals in the case where there is no slope. On the contrary, the difference between these signals becomes a signal having a phase difference of about 9° from the sum of these signals. Therefore, when the output signal of the differential circuit 58 is detected in synchronization with a signal having a phase difference of 80° from the signal of the synthetic circuit 54, only the positive portion of the signal caused by the acceleration of gravity is detected.

Figure 5:
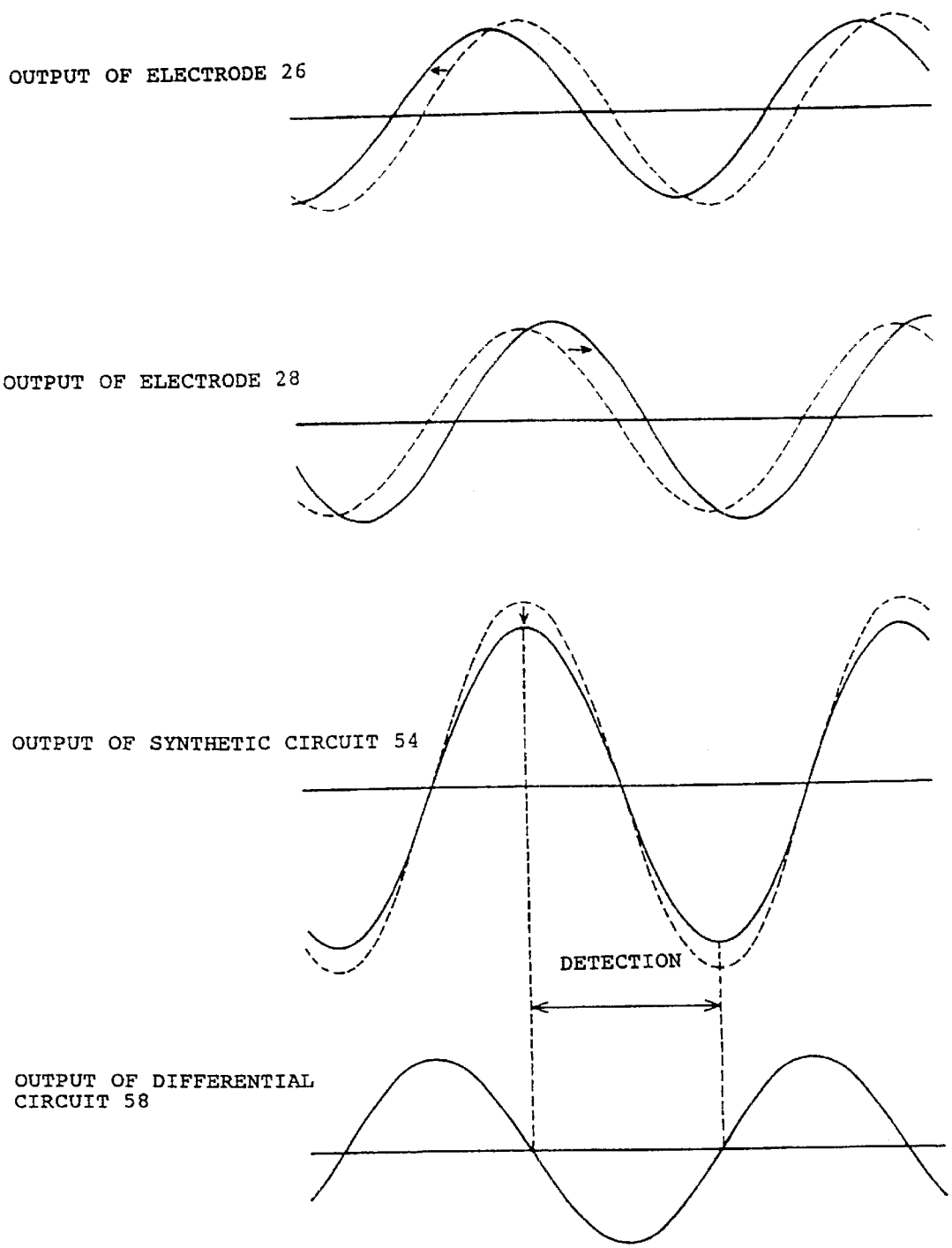
FIG. 5 shows the waveforms representing the signal of each portion at the time when a vibrator is inclined in another direction and the timing of detection in a second synchronous detection circuit.

When the vibrating body 14 is inclined in the opposite way, the relationship between the stresses acting on the electrode portion 26 of the vibrating body 14 and the electrode portion 28 of the vibrating body 14 is reversed, and as shown in FIG. 5, the relationship of phase between the signals output from the electrodes 26 and 28 is reversed. In this case, the sum of these signals becomes nearly in phase with the sum of the output signals in the case where there is no slope. Further, the difference of these signals becomes a signal having a phase difference of about 90° from the sum of these signals. Then, when compared with the signals in the case where the vibrating body is inclined in the opposite way, they are in opposite phase with each other. Therefore, when the output signal of the differential circuit 58 is detected in synchronization with a signal having a phase difference of 90° from the signal of the synthetic circuit 54, only the negative portion of the signal caused by the acceleration of gravity is detected.

In this way, by obtaining the difference between the output signals from the electrodes 26 and 28 in the differential circuit 58 and detecting the difference in synchronization with a signal having a phase difference of 90° from the signal of the synthetic circuit 54 the inclination of the vibrating body 14 can be detected. And when the signal detected in the second synchronous detection circuit 66 is integrated in the integration circuit 70 and further amplified in the DC amplifier 72, the extent of the inclination can be learned from the level and the direction of the slope can be learned from the polarity.

The detection of such a inclination of the vibrating body 14 is actually the detection of the acceleration of gravity, and linear acceleration other than the acceleration of gravity can be also detected. To be more precise, because by the acceleration in the direction normal to the axis of the vibrating body 14 a difference in the resonance frequency of each portion of the vibrating body is caused to result in a phase difference between the electrodes 26 and 28, by detecting the output signal of the differential circuit 58 in synchronization with a signal having a phase difference of 90° from the signal of the synthetic circuit 54 the acceleration can be detected.

Furthermore, the difference between the signals output from the electrodes 26 and 28 in response to the Coriolis force and the difference between the signals output from the electrodes 26 and 28 in response to the linear acceleration show a phase difference of about 90°. Because of that, in the first synchronous detection circuit 60 the output signal of the differential circuit 58 is detected in synchronization with the signal from the synthetic circuit 54, and accordingly the signal in response to the linear acceleration is detected so as to contain both of the positive and negative portions and these are offset by integration in the integration circuit 62. In like manner, in the second synchronous detection circuit 66 the output signal of the differential circuit 54 is detected in synchronization with a signal having a phase difference of 90° from the signal of the synthetic circuit 54, and accordingly the signal in response to the Coriolis force is detected so as to contain both of the positive and negative portions and these are offset by integration in the integration circuit 70. Consequently, in the output signal of the DC amplifier 64 only the information in response to the Coriolis force is contained, and in the output signal of the DC amplifier 72 only the information in response to the linear acceleration is contained.

Thus, in the sensor device 10, rotational angular velocity can be detected by the first synchronous detection circuit 60, and linear acceleration can be detected by the second synchronous detection circuit 66. Because of that, when the sensor device 10 is mounted on an automobile, and so on, it is able to detect the automobile turning sideways in consideration of the inclination of the automobile and make the corresponding side air bag inflated. Furthermore, by detecting the linear acceleration in a sideway collision, etc. the side air bag can be also inflated. Further, when the sensor device 10 is mounted on a video camera, etc., it is able to carry out horizontal detection and obtain an excellent image stabilization system.

Figure 6:
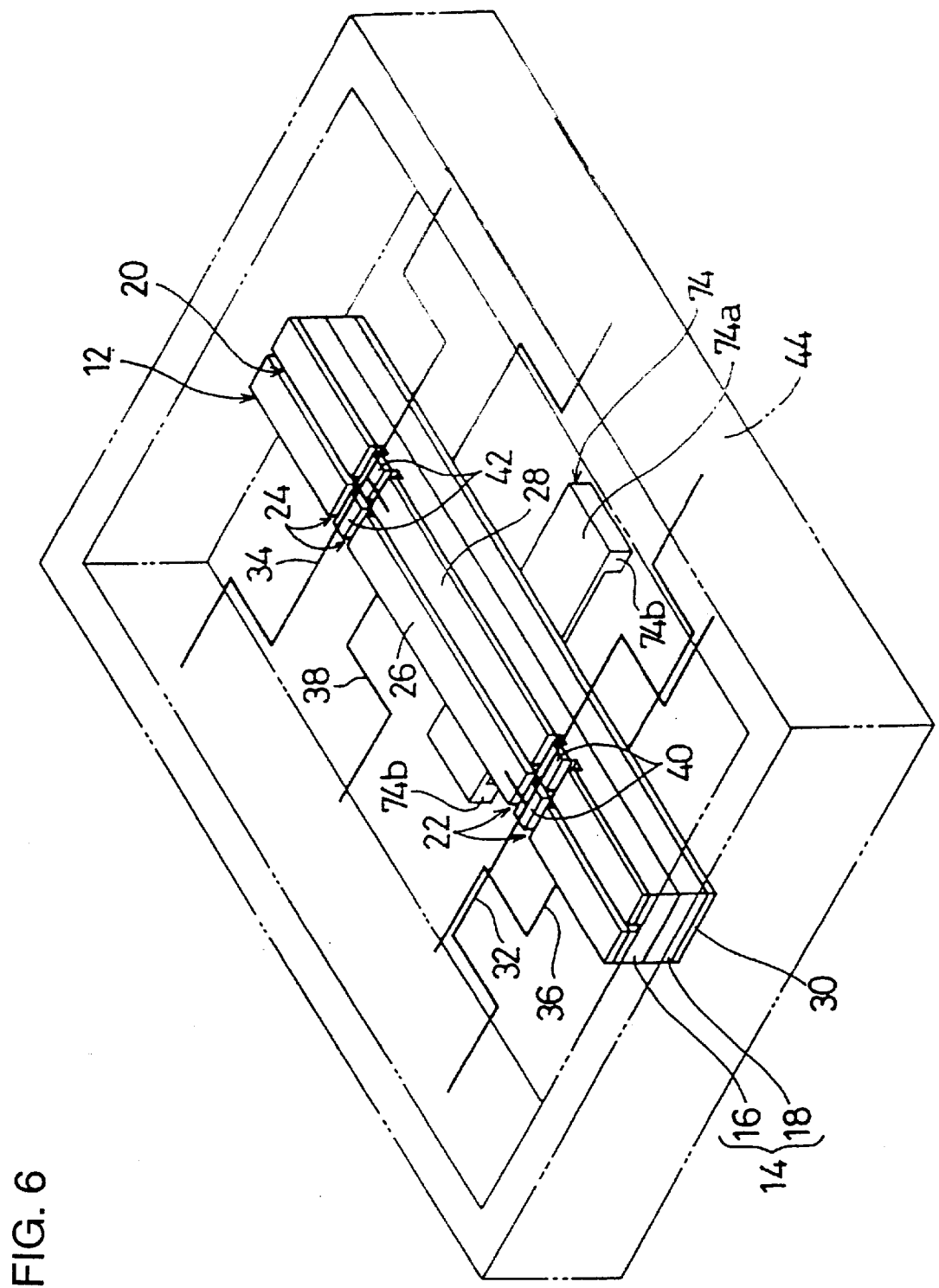
FIG. 6 is a perspective view showing another example of a vibrator used in a sensor device of the invention.
Figure 7:
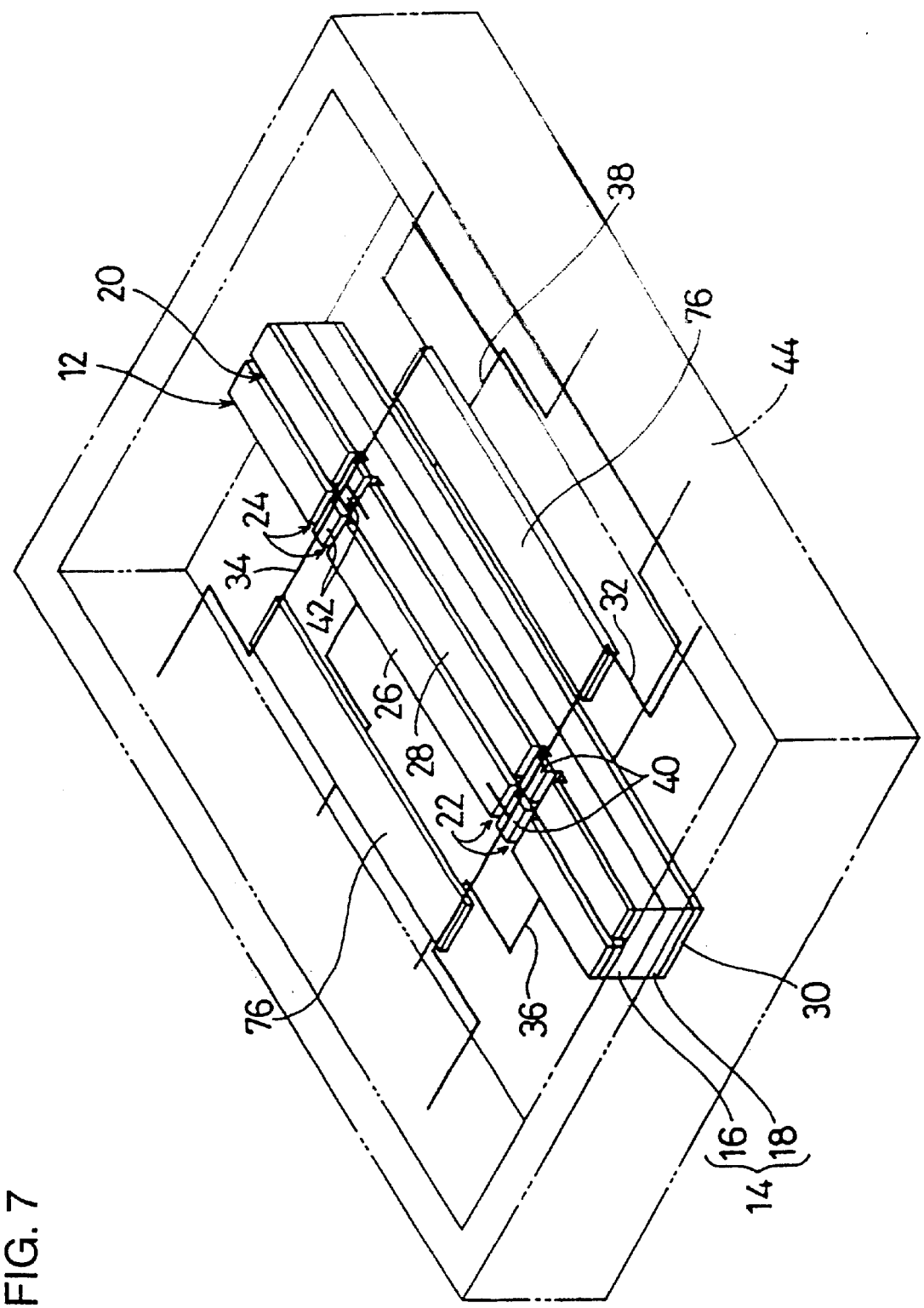
FIG. 7 is a perspective view showing further another example of a vibrator used in a sensor device of the invention.

In the sensor device 10, a weight 74 may be mounted in the middle of the length direction of the vibrating body 14 on the lower surface of the vibrating body 14 as shown in FIG. 6. The weight 74 contains, for example, a plate-like material 74a, and at both ends of the plate-like material 74a a block material 74b is formed. And the plate-like material 74a the middle of which was bonded to the vibrating body 14 can make noticeable the effect of the inclination of the vibrating body 14 on the stress. Further, as shown in FIG. 7, a plate-like weight 76 may be mounted on both sides of the vibrating body 14 between the supporting members 32 and 34. The supporting members 32 and 34 are connected to the portions corresponding to the nodal points of the vibrating body 14, but the nodal points are on the axis of the vibrating body 14 and it cannot be said that the connected portions of the supporting members 32 and 34 are not vibrated at all. Therefore, the supporting members 32 and 34 are also vibrated to some extent, and the vibrating system is affected by the mounting of the weight 76 and the effect of the inclination of the vibrating body 14 on the stress can be made noticeable. The effect was able to be experimentally confirmed.

Figure 9:
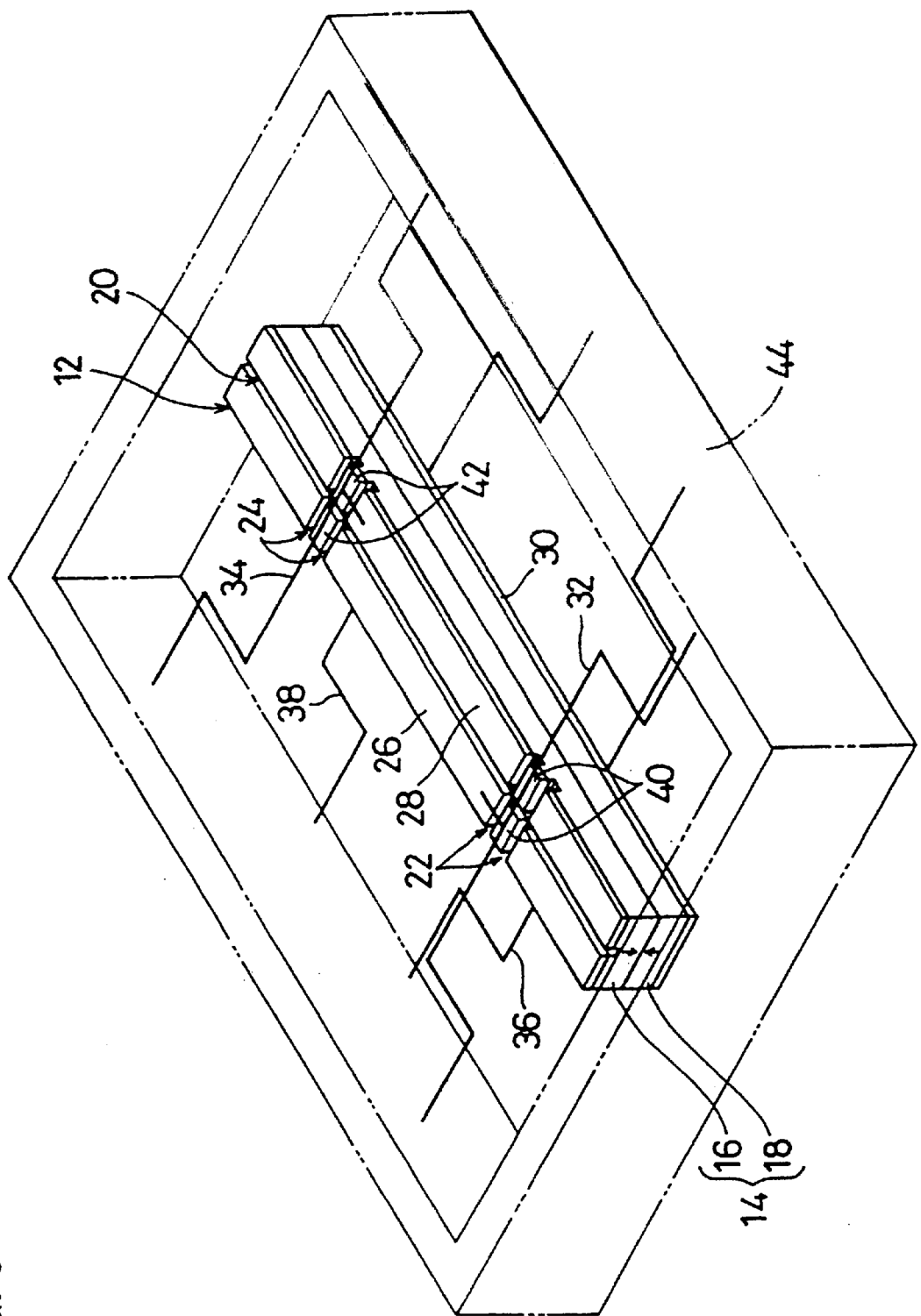
FIG. 9 is a perspective view showing one example of a vibrator used in a sensor device.
Figure 10:
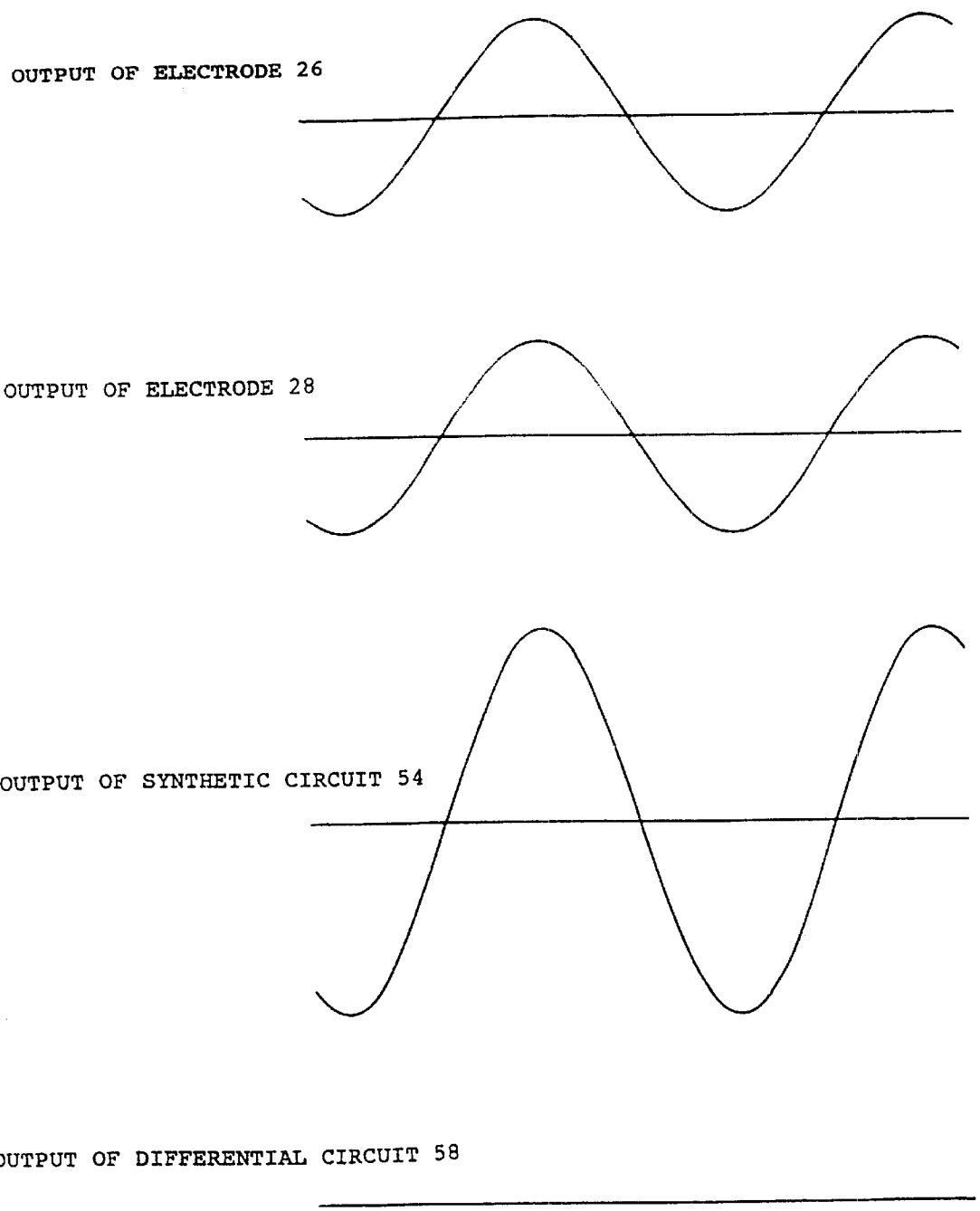
FIG. 10 shows the waveforms representing the signal of each portion at the basic vibration.
Figure 11:
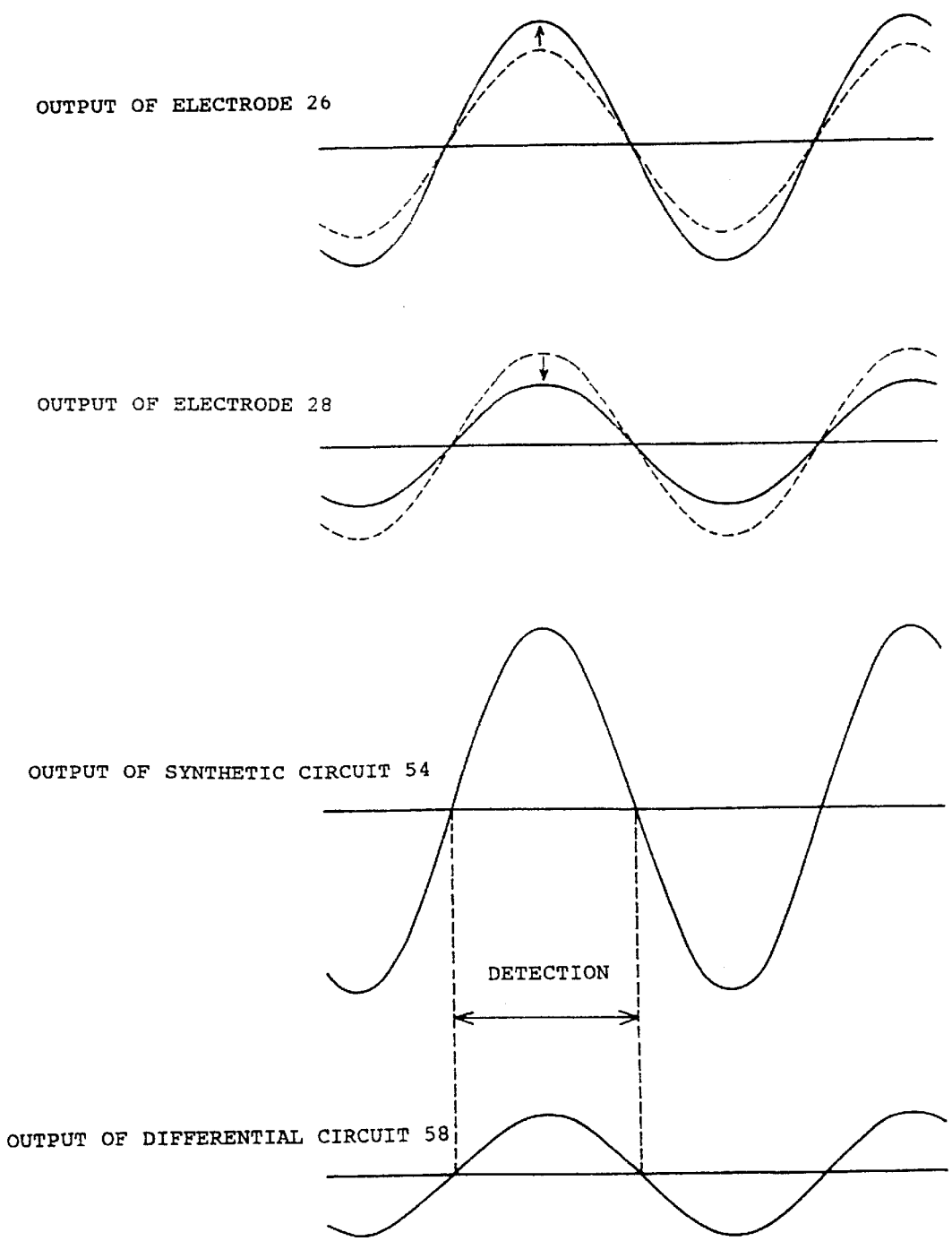
FIG. 11 shows the waveforms representing the signal of each portion and the timing of detection in a synchronous detection circuit at the time when a vibrator is rotated in one direction.

Further, in the vibrator 12 shown in FIGS. 6, 7, and 9, a common electrode is formed on the piezoelectric substrate 16 of the vibrating body 14 and the grooves 20, 22, and 24 are formed through a dicer, etc., and thus the electrodes 26, 28, 40, and 42, and the outside electrodes are formed. However, the outside electrodes have no relationship with the operation of the vibrator 12. Accordingly, the outside electrodes may not be formed, and when the electrodes are formed by sputtering, etc. it is sufficient to only form the electrodes 26, 28, 40, and 42. Further, the electrodes 40 and 42 are for the supporting members 32 and 34 to be connected thereto by welding or soldering, and they do not need to be separated into two. Furthermore, when the electrodes are formed by etching, etc. after a common electrode has been formed on the vibrating body 14, the outside electrodes can be completely eliminated.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A sensor device for detecting a rotational angular velocity, an inclination and a linear acceleration, comprising:

a vibrating body, two detection portions on the vibrating body to output signals in response to a vibration of the vibrating body, a differential circuit to output the difference between the signals output from the two detection portions, a synthetic circuit to output the sum of the output signals from the two detection portions, a phase detector to receive an output signal of said synthetic circuit, said phase detector providing an output signal of phase correction of 90°, a first synchronous detection circuit to receive an output signal of said differential circuit and an output signal of said synthetic circuit, and a second synchronous detection circuit to receive an output signal of said differential circuit and said output signal of said phase detector.

2. A sensor device as claimed in claim 1, wherein a weight is added to the vibrating body.

3. A sensor device as claimed in claim 1, wherein supporting members are provided for supporting the vibrating body, and wherein a weight is added to the supporting members.

4. A sensor device as claimed in claim 1, wherein at least one supporting member is provided for supporting the vibrating body and a weight is added to the supporting body.

5. A sensor device as claimed in claim 1, wherein a first integration circuit integrates an output signal of the first synchronous detection circuit and a first amplifier amplifies an output signal of the first integration circuit, an output signal of the first amplifier representing angular rotation.

6. A sensor device as claimed in claim 5, wherein a second integration circuit integrates an output signal of the second synchronous detection circuit and a second signal of the amplifier representing signal of the second integration circuit, an output signal of the second amplifier representing inclination and/or liner acceleration.

7. A sensor device as claimed in claim 6, wherein the ouput signal of the first amplifier contains information relative to a linear acceleration of the vibrating body.

8. A sensor device for detecting a rotational angular velocity, an inclination and a linear acceleration, comprising:

a vibrating body, two detection portions on the vibrating body to output signals in response to a vibration of the vibrating body, a differential circuit to output the difference between the signals output from the two detection portions, and a first synchronous detection circuit and a second synchronous detection circuit to detect the output signal of the differential circuit, wherein in the first synchronous detection circuit and second synchronous detection circuit the output signal of the differential circuit is detected in synchronization with respective input synchronizing signals having a phase difference of 90°, wherein an integration circuit integrates an output signal of the second synchronous detection circuit and an amplifier amplifies an output signal of the integration circuit, an output signal of the amplifier representing inclination and/or linear acceleration.

* * * * *